Figure 1:
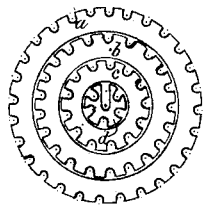

(No Model.)

S. F. SHELBOURNE.
ELECTRIC CABLE.

No. 275,424.   Patented Apr. 10, 1883.

Witnesses.
John Buckler,
Geo. D. Weed

Inventor.
Sidney F. Shelbourne

UNITED STATES PATENT OFFICE.

SIDNEY F. SHELBOURNE, OF NEW YORK, N. Y.

ELECTRIC CABLE.

SPECIFICATION forming part of Letters Patent No. 275,424, dated April 10, 1883.

Application filed January 12, 1883. (No model.)

*To all whom it may concern:*

Be it known that I, SIDNEY F. SHELBOURNE, a citizen of the United States, residing in the city of New York, and State of New York, have invented certain new and useful Improvements in Electric Cables; and I do hereby declare that the following is a full, clear, and exact description of the invention, which will enable others skilled in the art to which it appertains to make and use the same.

It is well known that since the invention and introduction of the telephone to business and social uses great difficulties and inconveniences have resulted from the extreme sensitiveness of that instrument to the presence, in parallel extension, of other wires conveying currents of electricity, with the wires in immediate connection with the instrument itself. In such case inductive influences have caused the telephone to indicate articulate speech and noises, due to the transmission of electrical impulses on the parallel wires, to appear as if those wires were in actual electrical connection with its own circuit. Various expedients have been adopted to obviate this difficulty in the case of single wires or circuits, and some experimenters, in the case of a number of parallel wires assembled in the same train within pipes or other conduits, supposing this "induction" to be merely a leakage of electricity from one insulated wire to another parallel with it through the insulating substance, have resorted to the expedient of placing little wire fillets about the insulated wires, and these fillets placed in connection with each other, and all with the ground, through the medium of contact with the inclosing-conduit, made of iron, to lead off the supposed leaking electricity, hoping thus to obviate its effects upon the parallel wires. It is to be observed, however, that in the use of the telephone the current producing the effect is itself a secondary or "induced" current, and therefore "leakage," as understood in battery-circuits, has not here an identical application. If leakage were the true scientific explanation of induction, then a metallic circuit, or even such a circuit arranged as a "solenoid," would be no more likely to counteract its manifestations than the devices of the experimenters mentioned; but, on the contrary, it is known that in a simple metallic circuit, where currents or waves of electricity from the earth as a storage-reservoir cannot mount upon the wires in the immediate locality of the instruments, the induction is in a large measure obviated, leaving only those manifestations which are due to a disturbed equilibrium on adjacent wires. When, however, we come to the solenoid-circuit, which in its proper application involves an equilibrium of conductivity between two wires, one of which passes in the longitudinal axis of the other, arranged as a helix about it, we see that the absence of induction is due to an entirely different principle from that which may be explained under the term "leakage;" but the solenoid-circuit can be realized when considering two wires only, or their equivalents, in an outgoing and return metallic connection, and to make a practical use of this in connection with each telephone-instrument would be both cumbersome and expensive. The object therefore of my present invention is to accomplish substantially or nearly the same result in a different way; and it consists (while paying no regard to the position of the longitudinal axis of a helix or a series of helices in the arrangement of the wires with reference to each other, but relying on the known scientific principle that when currents are passing at right angles to each other, if the conductors and the currents are equal, the inductive influence of each is balanced by that of the other) in the arrangement of a large number of wires within an electric cable supported in series upon annular templets or supports, so that the wires of each successive series, commencing nearest the center of the cable, shall pass in spirals alternately in opposite directions, from left to right and right to left, in the same linear direction, thus causing those of each added series to cross those of the next inner series. To this arrangement of the wires I add a second arrangement, which involves the reversing of the polarity of the currents in the wires of the same relative series in the successive sections of the cable between the test or distributing boxes which serve to connect the several sections with each other. Thus, taking for example the outer series of spiral wires in each successive section of the cable, if those in the one section pass in spirals from left to right, those in the next section will pass in like spirals from right to left.

A third element of my invention consists in avoiding a ground-connection near the instruments to be affected; and to this end, upon the cable having its wires insulated in solid mass, and before protecting and further supporting this insulation by jute or other wrappings, which are also prepared as insulating-covering for the cable, I pass spirally around the several sections of the cable, in spiral of opposite direction to the spirals of the outer series of wires, a metal strip, preferably of copper, which may be used, either wholly or partially, as a return-circuit, and which forms or may form a ground-connection at any location between the instruments in operation at different points from each other.

Figure 2:
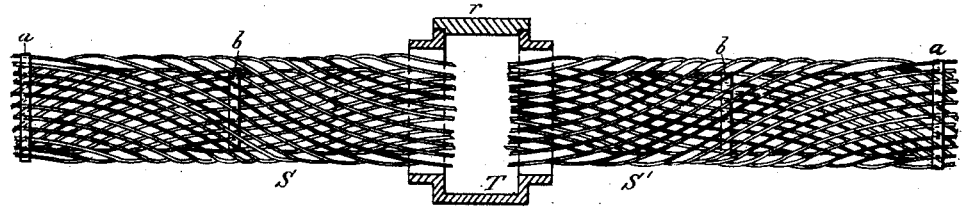
Figure 3:
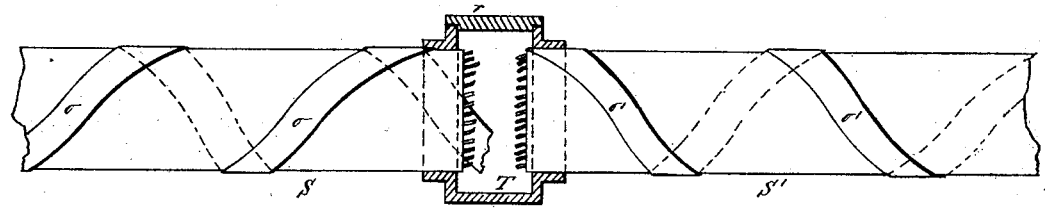
Figure 4:
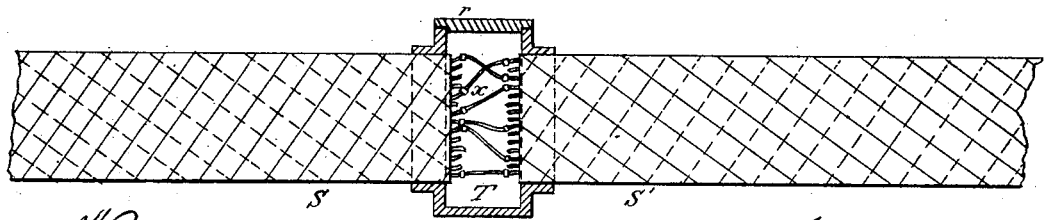

Proceeding to illustrate more particularly in the drawings herewith the several arrangements, and the disposition of the wires upon annular templets to support them, and by the circumferential movement of which upon each other the wires are given spiral twists in opposite directions, Figure 1 shows the series of rings or templets to support the wires in succession, which are held in notches on the outer edges of the templets, and each templet, with its series of wires, passing snugly within the templets of the next larger series. Fig. 2 represents, for clearness of illustration, only the two outer series of wires supported on their respective templets and passing in opposite or crossing spirals. This figure shows also two sections of the skeleton cable, each with spirals the reverse to those of the other, approaching each other within a test or distributing box, so as to be connected, as may be desired. In Fig. 3 the skeleton cable of Fig. 2 is shown as having been filled with the plastic and fusible insulating material, and passing spirally around this the metal strip for the return-circuit or ground-connection at any point of the circuit, as may be determined to be most advantageous. Fig. 4 shows two sections of the cable completed with the jute and tarred bandages or wrapping and the variations of making the connections of the wires between the two sections of the cable within the test-box containing their two adjacent ends.

Like letters refer to the same parts in the several figures.

Referring again to Fig. 1, it will be seen that as the templet $d$ is repeated along the core or line of constructing-cable, each one in progression may be twisted round with reference to the last one, thus giving the wires it supports a spiral either from left to right or right to left, as may be desired. When the series of templets $c$ are passed over the core of cable formed on the series $d$ the series $c$ are turned or twisted in the opposite direction to those of $d$, thus causing the wires supported on the series $c$ to pass in opposite spirals to those of the wires supported on the series $d$. The same succession is repeated with the series of templets $b$, and with the series $a$, to whatever size the skeleton cable may be contemplated. There is thus formed a completed section of the skeleton cable, as shown at S, Fig. 2. When another and succeeding section, S', is constructed the wires of the same corresponding series of templets are made to pass in spirals of a reverse direction to those in the section S. By this means the polarity of the current passing along a line of connected wires in the same corresponding series of spirals in the different sections of the cable will be changed or reversed in passing each section, so that, for instance, if a galvanometer caused to approach the outer series of wires in the section S of the cable during the passage of the current should be deflected from right to left its needle would be deflected from left to right when brought near the outer series of wires in the section S' under the same conditions. The spiral metal strip for the return-circuit or ground-connection at any point, as may be desired, is shown at $o\ o$ and $o'\ o'$, Fig. 3. In this figure the wires, as shown in Fig. 2, are filled and covered with the material used for insulation in mass, so that the spiral strips $o\ o$ and $o'\ o'$ are themselves insulated from the outer series of wires by a quarter of an inch in thickness (more or less) of the insulating material inclosing the wires as they appear in Fig. 2. It will be seen that the strips $o\ o$ and $o'\ o'$ in the successive sections of the cable may be connected with each other at the test-boxes, or otherwise with the ground, to fulfill the purposes for which they are provided. When the sections of the cable have been brought to the condition shown in Fig. 3 they are then wrapped with one or more layers of heavy jute bandages saturated with pitch, asphalt, or other coarse insulating material, and the whole painted or mopped with melted coal-tar resin, which, when cold, will give the cable a hard, dense, and tough exterior of jute fiber and water-proof and imperishable asphalt and resin, as shown in Fig. 4. An illustration of the almost infinite control and variation of the connections between the wires of the different sections of the cable is suggested at $x$, Fig. 4. For instance, if each section of the cable should contain sixty-eight wires, the possible variations of connection between the wires from left to right or right to left from one series to the other, or from one relation in the same series to a position of different relation, would be represented by the almost infinite combinations of the sixty-eight units representing the numbers of the wires.

In the drawings, T represents in the several figures the test or distributing boxes within which the diversities of the connections between the wires of the different sections of the cable are made, and $r$ represents the removable cover fitted upon the same to allow of access to the ends of the wires.

Having thus fully described my invention and the manner in which the same is to be carried into effect, what I claim, and desire to secure by Letters Patent of the United States, is—

1. In electric cables for subterranean uses, the combination of successive circumferential series of wires with annular templets supporting them in such an arrangement and relation that the wires in each series pass in spirals of opposite direction and crossing the like spirals of the wires of the next adjacent series, as shown and described.

2. In underground electric cables in which the conducting-wires are arranged in circumferential series of spiral direction, the combination of one section of the cable with its following section in such an arrangement and relation of the wires of the same corresponding series of each that the said wires pass from left to right in the one section and from right to left in the succeeding section for the purpose of reversing the magnetic polarity of the electric currents, as described.

3. In cables forming underground electric-telephone lines of several circumferential series of wires, such series crossing each other in opposite spirals and insulated in mass, the combination, with the outer series of such spiral wires, of a spiral metallic strip or other conductor of an opposite or crossing spiral to those of the said outer series of wires, but surrounding their common insulation, and being itself insulated from the ground by the exterior coating of the cable for the purpose of forming, in whole or in part, a return-conduction of the electrical currents to prevent induction in the cable by the crossing with such currents the currents of the inclosed adjacent series of wires, as herein set forth.

In testimony whereof I have subscribed my name hereto in the presence of two witnesses.

SIDNEY F. SHELBOURNE.

Witnesses:
 CHAS. RILEY,
 GEO. L. WEED.